(12) United States Patent
Cook

(10) Patent No.: US 11,993,540 B2
(45) Date of Patent: May 28, 2024

(54) WASTE PLASTIC CONVERSION

(71) Applicant: Jonathan Cook, Statesboro, GA (US)

(72) Inventor: Jonathan Cook, Statesboro, GA (US)

(*) Notice: Subject to any disclaimer, the term of this patent is extended or adjusted under 35 U.S.C. 154(b) by 859 days.

(21) Appl. No.: 16/842,984

(22) Filed: Apr. 8, 2020

(65) Prior Publication Data

US 2020/0325069 A1    Oct. 15, 2020

Related U.S. Application Data

(60) Provisional application No. 62/831,292, filed on Apr. 9, 2019, provisional application No. 62/831,282, filed on Apr. 9, 2019.

(51) Int. Cl.
| | |
|---|---|
| *B29C 67/02* | (2017.01) |
| *B02C 23/00* | (2006.01) |
| *B29B 9/08* | (2006.01) |
| *B29B 9/10* | (2006.01) |
| *B29C 37/00* | (2006.01) |
| *B29C 59/00* | (2006.01) |
| *B29C 59/02* | (2006.01) |

(Continued)

(52) U.S. Cl.
CPC .............. *C04B 18/20* (2013.01); *B02C 23/00* (2013.01); *B29B 9/08* (2013.01); *B29B 9/10* (2013.01); *B29C 37/0025* (2013.01); *B29C 59/005* (2013.01); *B29C 59/02* (2013.01); *B29C 67/0048* (2013.01); *B29C 67/02* (2013.01); *C04B 7/02* (2013.01); *C04B 14/06* (2013.01); *C10G 1/10* (2013.01); *B29C 2059/028* (2013.01); *C08J 11/04* (2013.01); *C08J 11/06* (2013.01)

(58) Field of Classification Search
CPC ....... B29C 67/02; B29B 17/0026; B29B 9/08; B29B 9/10; C08J 11/04; C08J 11/06
See application file for complete search history.

(56) References Cited

U.S. PATENT DOCUMENTS

| | | | |
|---|---|---|---|
| 4,678,342 A * | 7/1987 | Dalman | B01F 29/25 366/186 |
| 2017/0260093 A1* | 9/2017 | Barrow | C04B 18/022 |

(Continued)

FOREIGN PATENT DOCUMENTS

GB        2343389        * 5/2000

OTHER PUBLICATIONS

Civil Engineering, Bulk Density of Sand https://civiltoday.com/civil-engineering-materials/sand/299-bulk-density-of-sand (Year: 2023).*

(Continued)

*Primary Examiner* — Arrie L Reuther
*Assistant Examiner* — Alexander A Wang
(74) *Attorney, Agent, or Firm* — NIXON & VANDERHYE P.C.

(57) ABSTRACT

Waste plastic can be converted into rock for decorative and utilitarian applications. A combination of sand and waste plastic is added into a tumbling chamber, and the tumbling chamber is rotated. The combination of sand and waste plastic is heated while rotating the tumbling chamber to form conglomerates. When a desired size of the conglomerates is achieved, the heating is stopped. Dry cement is then added to the tumbling chamber while continuing to rotate the tumbling chamber.

12 Claims, 2 Drawing Sheets
(1 of 2 Drawing Sheet(s) Filed in Color)

(51) Int. Cl.
*B29C 67/00* (2017.01)
*C04B 7/02* (2006.01)
*C04B 14/06* (2006.01)
*C04B 18/20* (2006.01)
*C10G 1/10* (2006.01)
*C08J 11/04* (2006.01)
*C08J 11/06* (2006.01)

(56) References Cited

U.S. PATENT DOCUMENTS

2018/0086671 A1* 3/2018 Sajoux .................. C04B 14/06
2020/0248410 A1* 8/2020 Crupi .................. E01C 19/1004
2022/0126482 A1* 4/2022 Thomson ................ C04B 18/20

OTHER PUBLICATIONS

Dielectric Manufacturing, Material Properties of Polyethylene (PE) Thermoplastic https://dielectricmfg.com/knowledge-base/polyethylene/ (Year: 2023).*

* cited by examiner

WASTE PLASTIC CONVERSION

CROSS-REFERENCES TO RELATED APPLICATIONS

This application claims the benefit of U.S. Provisional Patent Application No. 62/831,282, filed Apr. 9, 2019, and U.S. Provisional Patent Application No. 62/831,292, filed Apr. 9, 2019, the entire content of each of which is herein incorporated by reference.

STATEMENT REGARDING FEDERALLY SPONSORED RESEARCH OR DEVELOPMENT (NOT APPLICABLE)

BACKGROUND

The invention relates to processing recyclable materials and, more particularly, to a barrel shredder used to process recyclable plastic and a waste plastic conversion machine and process for recyclable plastics.

Plastics are inexpensive and durable materials, which can be used to manufacture a variety of products that find use in a wide range of applications. The production and use of plastics have increased dramatically over the last decades. About 40% of these plastics are used for single-use disposable applications, such as packaging, agricultural films, disposable consumer items or for short-lived products that are discarded within a year of manufacture. Because of the durability of the polymers involved, substantial quantities of plastics are piling up in landfill sites and in natural habitats worldwide, generating increasing environmental problems. Even degradable and biodegradable plastics may persist for decades depending on local environmental factors such as levels of ultraviolet light exposure, temperature, presence of suitable microorganisms, etc.

One solution to reduce environmental and economic impacts correlated to the accumulation of plastic is closed-loop recycling, where plastic material is mechanically reprocessed to manufacture new products. For example, one of the most common closed-loop recycling processes is the polyethylene terephthalate (PET) recycling. PET wastes are subjected to successive treatments leading to food-contact-approved recycled PET (rPET), which is collected, sorted, pressed into bales, crushed, washed, chopped into flakes, melted and extruded in pellets and offered for sale. Then, these recycled PET may be used to create fabrics for the clothing industry or new packaging such as bottles or blister packs, etc.

Plastic wastes, however, are generally collected all together, so that plastic bales contain a mixture of different plastics, the composition of which may vary from source to source, and the proportions of which may vary from bale to bale. Consequently, recycling processes require preliminary selection to sort out the plastic products according to their composition, size, resin type, color, functional additives used, etc.

SUMMARY

It would thus be desirable for a plastic recycling process that can convert recyclable plastics into useful new products. It would also be desirable for this process to utilize different plastics, eliminating the need for preliminary selection practices.

A barrel shredder may be used to process recyclable plastic. The barrel shredder is a low-cost machine designed for shredding plastic, paper, and other "soft" materials, as well as pulverizing glass waste to create glass "sand." As designed, the shredder is suitable for small scale waste management and recycling organizations but can be scaled up to meet the demand for greater volume.

For optimum processing, it is desirable that the plastic be rigid/semi-rigid, less than or equal to 0.25 inches wall thickness, and limited in overall size to accommodate the opening to the shred chamber. Glass should be untempered, less than or equal to 0.75 inches wall thickness, and limited in overall size to accommodate the opening to the shred chamber.

A waste plastic conversion machine and process are designed to be simple and low-cost/high-volume for converting waste plastic into "rock" for use in decorative and utilitarian applications, such as non-structural concrete. The term "waste plastic" refers to most consumer plastic packaging, utilitarian items, and decorative items. The word "rock" is defined as a small, hard, conglomeration of glass powder or sand and fused plastic.

In an exemplary embodiment, a method of converting waste plastic into rock for decorative and utilitarian applications includes the steps of (a) adding a combination of sand and waste plastic into a tumbling chamber; (b) rotating the tumbling chamber; (c) heating the combination of sand and waste plastic while performing step (b) to form conglomerates; (d) when a desired size of the conglomerates is achieved, discontinuing the heating; and (e) adding dry cement to the tumbling chamber while continuing to rotate the tumbling chamber.

The waste plastic may include shredded waste plastic, and step (a) may be practiced by adding 1.25 parts sand to 1 part shredded waste plastic into the tumbling chamber. Step (c) may be practiced by heating the combination of sand and waste plastic to a temperature between 325-375° F. In this context, step (c) may be practiced by raising a temperature of the combination of sand and waste plastic by about 50° F. per minute. In some embodiments, the dry cement embeds itself into a surface of the conglomerates, and step (e) may be practiced by continuing to rotate the tumbling chamber until a surface temperature of the conglomerates may be cooled to 250° F. or less.

The method may further include, prior to step (d), evacuating exhaust gasses from the tumbling chamber. Step (e) may be practiced by adding three pounds of the dry cement at a rate of one pound per 10 seconds. Step (e) may be practiced by adding a dry colorant to the dry cement. The sand in step (a) may include masonry sand or glass powder. Step (b) may be practiced by rotating the tumbling chamber at a rate of 36 RPMs. The method may include, after step (d) and prior to step (e), continuing to rotate the tumbling chamber.

The waste plastic may include plastic bags or film, and step (c) may be practiced by maintaining a temperature in the tumbling chamber above 300° F. and tumbling the combination of sand and plastic bags or film at a temperature of about 325° F. In this context, the method may include, after step (e), emptying the conglomerates into a vibratory sift and removing excess sand.

In another exemplary embodiment, a method of converting waste plastic into rock for decorative and utilitarian applications uses a waste plastic conversion machine including a base frame, a supporting bracket secured to the base frame, a trunnion wheel secured on the supporting bracket, a tumbling chamber including a trunnion ring, and a heat source secured on the supporting bracket and positionable adjacent the tumbling chamber. The method includes the steps of (a) adding a combination of sand and waste plastic into a tumbling chamber; (b) rotating the tumbling chamber with the trunnion ring engaging the trunnion wheel; (c) heating the combination of sand and waste plastic with the heat source while performing step (b) to form conglomerates until a desired size of the conglomerates is achieved, wherein step (c) is practiced at a higher temperature for larger sized conglomerates; (d) smoothing exterior surfaces of the conglomerates by continuing to rotate the tumbling chamber; and (e) adding dry cement colored with a dry colorant to the tumbling chamber while continuing to rotate the tumbling chamber.

In yet another exemplary embodiment, a waste plastic conversion machine includes a base frame, a supporting bracket secured to the base frame, a trunnion wheel secured on the supporting bracket, and a tumbling chamber including a trunnion ring. The tumbling chamber is rotatably supported by the supporting bracket with the trunnion ring engaging the trunnion wheel. A heat source secured on the supporting bracket is positionable adjacent the tumbling chamber.

A motor connected to the tumbling chamber via a drive gear is configured to rotate the tumbling chamber via the drive gear.

In some embodiments, the tumbling chamber includes internal mixing vanes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other aspects and advantages will be described in detail with reference to the accompanying drawings, in which.

DETAILED DESCRIPTION

Figure 1:
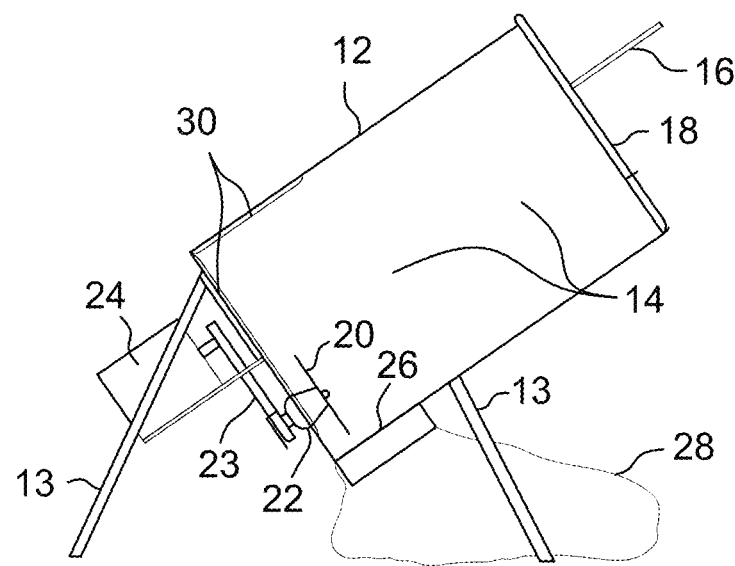
FIG. 1 shows a barrel shredder suitable for processing recyclable plastic.

FIG. 1 shows a barrel shredder for processing recyclable plastic. A barrel 12 is supported on supports 13 or the like. In use, material to be shredded enters the barrel 12 and into the shred chamber 14 by lifting the lid 16 and inserting material through the opening 18. This occurs while the machine is running. Once in the chamber, a blade 20 cuts the material into the desired size. The blade 20 as designed may rotate in a counter-clockwise direction at approximately 3600 rpm. In some embodiments, the blade 20 is 14" in length, sharpened on the leading edge, and has a down-turned trailing edge to help draw material into the blade 20 (for glass applications, the sharpened leading edge is replaced with a blunt carbide edge). The blade 20 is mounted on a spindle 22, which is belt driven via a drive belt 23 and powered by a 5HP electric motor 24. At the base of the machine, a rectangular perforated steel discharge plate 26 is mounted. The blade 20 and the discharge plate 26 are interchangeable with other blade types or discharge plate sizes in order to quickly change the material being processed. The openings in the perforated steel discharge plate 26 measure between 0.063" up to 0.5" depending on the desired final size of material.

The material is continually fed into the machine and processed by the rotating blade 20 until its size is small enough to allow for discharge through the discharge plate 26 into the attached collection bag 28.

The machine also has wear plates 30 mounted to the bottom and lower sides of the barrel enclosure. An exemplary material used for the wear plates 30 is 0.25" thick UHMWPE (Ultra High Molecular Weight Polyethylene).

Figure 2:
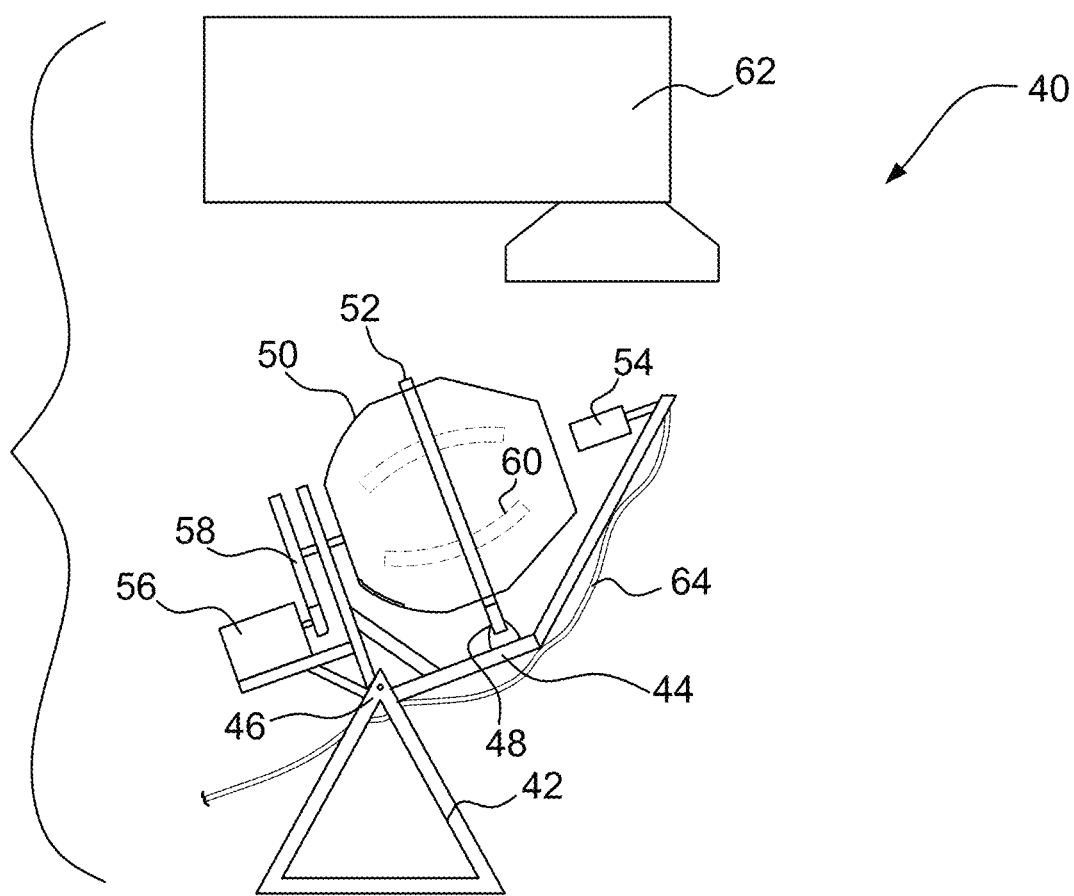
FIG. 2 shows a waste plastic conversion machine.

FIG. 2 shows a waste plastic conversion machine 40. The machine 40 is configured to further process the material from the barrel shredder into a finished product. With reference to FIG. 2, the machine 40 includes a base frame 42, a supporting bracket 44 secured to the base frame 40 on a pivot 46, a trunnion wheel 48 secured on the supporting bracket 44, and a tumbling chamber 50 including a trunnion ring 52. The tumbling chamber 50 is rotatably supported by the supporting bracket 44 with the trunnion ring 52 engaging the trunnion wheel 48. The pivot 46 allows for the chamber 50 to be emptied. A heat source 54 is secured on the supporting bracket 44 and is positionable adjacent the tumbling chamber 50. A motor 56 is connected to the tumbling chamber 50 via a drive gear 58. The motor 56 is configured to rotate the tumbling chamber 50 via the drive gear 58. The tumbling chamber 50 may be provided with internal mixing vanes 60.

A VOC (Volatile Organic Compound) air scrubber 62 serves to evacuate the exhaust gasses emitted from the tumbling chamber 50. The VOC air scrubber 62 is existing technology, and details thereof will not be further described. The VOC air scrubber is important for the safe operation of the machine 40.

The heat source 54 may be a propane torch head or the like positioned adjacent an opening in the tumbling chamber 50. A fuel line 64 delivers fuel to the torch head 54.

In use, a combination of sand and shredded plastic is added to the tumbling chamber 50 where it is rotated by the motor 56, mixed by the internal mixing vanes 60 and heated by the torch head 54. In some embodiments, the tumbling chamber 50 rotates in a counter-clockwise direction at 36 RPM. As designed, it is powered by a 1/2HP electric motor 56 turning at 1075 RPM, which utilizes a gear reduction system via drive gear 58 to produce the necessary RPM. The torch head 54 may be rated for 60,000 BTUs at full power and burns propane gas as designed. The torch head 54 is also mounted on a cantilever arm as shown so it can be moved out of the way for emptying the contents of the chamber 50.

The size of the processed "rock" can be varied from as small as 0.063" in diameter up to greater than 12" in diameter. The finish of the "rock" can be varied from rough to semi-smooth, and the style can vary from a similarity with crushed granite to a similarity with river rock. The color of the rock can be varied indefinitely. Waste plastic does not have to be washed or exactly separated in this process. In addition, labels and closures do not have to be removed.

The following process describes creating ½ cubic feet of river rock style material. The process begins with twelve pounds of shredded waste plastic with the approximate size of ½" diameter flakes. The mixture shall be approximately 35% PET/PETE/PETT, 35% HDPE/PP, and 30% various other types. This mixture can be varied to alter the ultimate properties and size of the final product. The plastic mix may contain labels, closures, content residue, and other miscellaneous contaminants at a rate of less than approximately 5% total weight. However, more contamination is acceptable and does not dramatically alter the process.

The twelve pounds of plastic are combined with sixteen pounds of fine sand (masonry sand) or glass powder (equivalent in size to masonry sand) (ratio of 1 pound plastic to 1.25 pounds sand/powder) in the tumbling chamber 50 of the waste plastic conversion machine 40. The machine 40 is turned on, and heat is added from the propane torch 54. The torch 54 is operated at a level to raise the temperature of the tumbling material approximately 50☐F per minute until the contents reach approximately 325☐F. At this point, the air scrubber 62 begins evacuating the exhaust gasses emitted from the tumbling chamber 50, and the temperature is held constant as the mixture begins to conglomerate. As conglomerates are formed, the conglomerates are visually observed for size. If a larger size is desired, the temperature may be increased to approximately 350-375☐F. When the final desired size is achieved, the torch 54 is turned off completely, and the material is allowed to tumble for approximately two minutes in order to smooth the surface.

Then, approximately three pounds of dry cement is added at the rate of one pound per ten seconds. The cement can be colored with a dry colorant to vary the shade of the rock. The material is then allowed to tumble freely, which allows the cement to embed itself into the surface of the softened material. The material tumbles until the surface temperature reaches 250☐F or less. At this point, the material is hard enough to retain its shape and can be emptied from the machine 40.

This process can be shortened in time (temperature raised faster and/or cutting out the smoothing phase) in order to produce an aggregate suitable for non-structural concrete. In this case, the cement used may be a typical Portland cement, which allows for complete bonding within the mixture of concrete. The "rock" produced is approximately 50% lighter than crushed granite which, when used as a substitute to crushed granite, produces a final concrete mix approximately 30% lighter than a typical crushed granite mix.

Plastic film can also be converted to the "rock" using a similar method. To make a similar volume, approximately 25 pounds of sand is loaded into the conversion machine and preheated to approximately 350☐F. Plastic bags and other film are then added at a rate where the sand evenly coats the plastic as it is added. The heat from the torch 54 is set to a level that maintains the ambient temperature of the tumbler 50 above 300 ☐F. Once the tumbler 50 is fully loaded, the mix is allowed to tumble at a temperature of approximately 325 ☐F until the plastic rock is fully formed. The mix is then allowed to cool as it tumbles until the surface temperature of the rocks are at or below 250☐F. The mix is then emptied into a vibratory sift where the excess sand is removed leaving only the formed plastic rocks.

Figure 3:
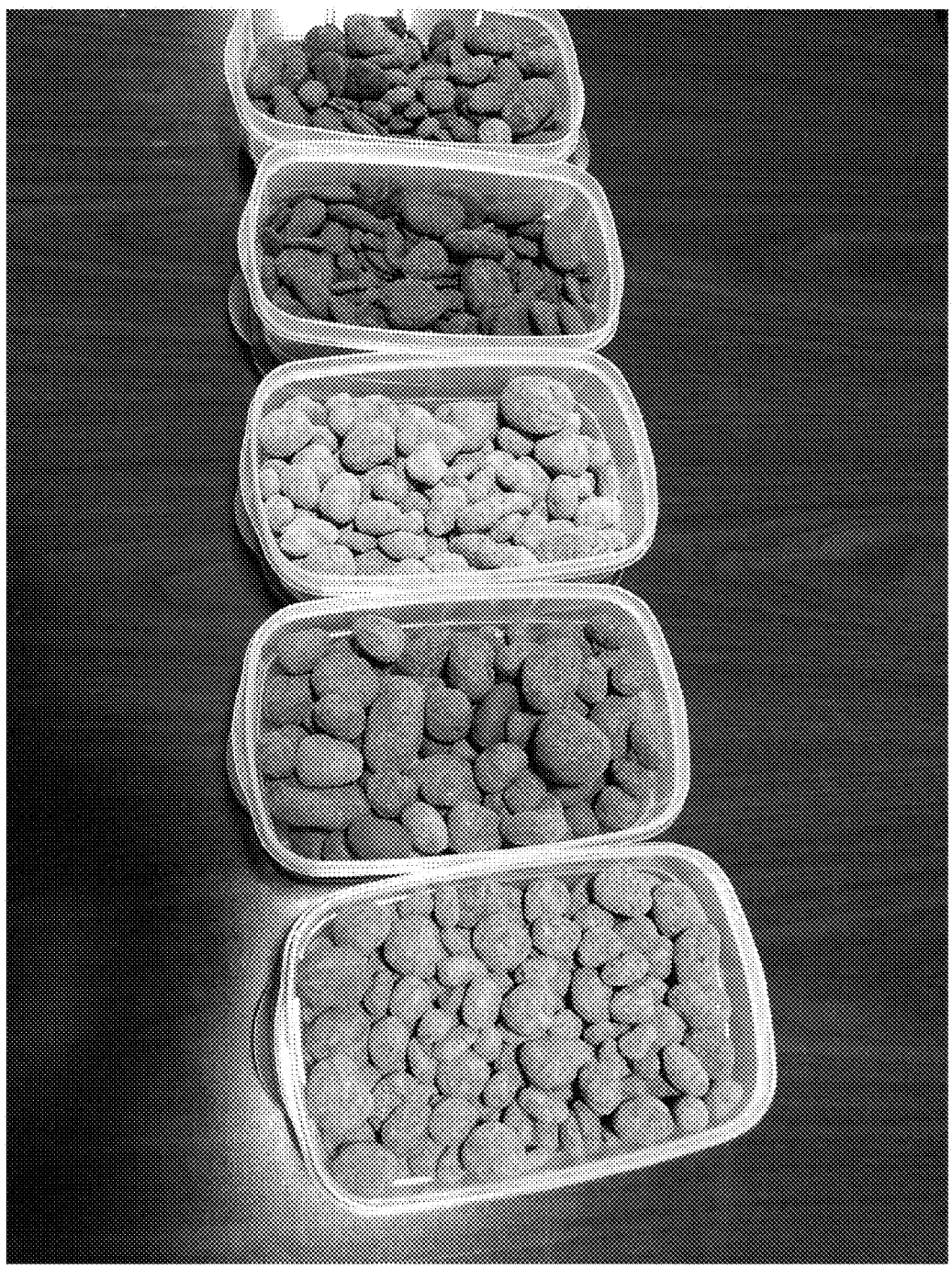
FIG. 3 is a color image showing examples of the final product in various colors.

FIG. 3 is a color image showing examples of the final product in various colors. As noted, the color of the rocks can be varied indefinitely.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of converting waste plastic into rock for decorative and utilitarian applications using a waste plastic conversion machine including a base frame, a supporting bracket secured to the base frame, a trunnion wheel secured on the supporting bracket, a tumbling chamber including a trunnion ring, and a heat source secured on the supporting bracket and positionable adjacent the tumbling chamber, the method comprising:
   (a) adding a combination of sand and waste plastic into a tumbling chamber;
   (b) rotating the tumbling chamber with the trunnion ring engaging the trunnion wheel;
   (c) heating the combination of sand and waste plastic with the heat source while performing step (b) to form conglomerates until a desired size of the conglomerates is achieved, wherein step (c) is practiced at a higher temperature for larger sized conglomerates;
   (d) smoothing exterior surfaces of the conglomerates by continuing to rotate the tumbling chamber; and
   (e) adding a finishing material to the tumbling chamber while continuing to rotate the tumbling chamber.

2. A method of converting waste plastic into rock for decorative and utilitarian applications, the method comprising:
   (a) adding a combination of sand and waste plastic into a tumbling chamber;
   (b) rotating the tumbling chamber;
   (c) heating the combination of sand and waste plastic with a heat source while performing step (b) to form conglomerates until a desired size of the conglomerates is achieved, wherein step (c) is practiced at a higher temperature for larger sized conglomerates;
   (d) when a desired size of the conglomerates is achieved, discontinuing the heating; and
   (e) adding a finishing material to the tumbling chamber while continuing to rotate the tumbling chamber.

3. A method according to claim 2, wherein the waste plastic comprises shredded waste plastic, and wherein step (a) is practiced by adding, on a weight basis, 1.25 parts sand to 1 part shredded waste plastic into the tumbling chamber.

4. A method according to claim 2, wherein step (c) is practiced by heating the combination of sand and waste plastic to a temperature between 325-375° F.

5. A method according to claim 4, wherein step (c) is practiced by raising a temperature of the combination of sand and waste plastic by about 50° F. per minute.

6. A method according to claim 4, wherein in step (e), the finishing material embeds itself into a surface of the conglomerates, and wherein step (e) is practiced by continuing to rotate the tumbling chamber until a surface temperature of the conglomerates is cooled to 250° F. or less.

7. A method according to claim 2, wherein step (e) is practiced by adding three pounds of the finishing material at a rate of one pound per 10 seconds.

8. A method according to claim 2, wherein the sand in step (a) comprises masonry sand or glass powder.

9. A method according to claim 2, wherein step (b) is practiced by rotating the tumbling chamber at a rate of 36 RPMs.

10. A method according to claim 2, further comprising, after step (d) and prior to step (e), continuing to rotate the tumbling chamber.

11. A method according to claim 2, wherein the waste plastic comprises plastic bags or film, and wherein step (c) is practiced by maintaining a temperature in the tumbling chamber above 300° F. and tumbling the combination of sand and plastic bags or film at a temperature of about 325° F.

12. A method according to claim 11, further comprising, after step (e), emptying the conglomerates into a vibratory sift and removing excess sand.

\* \* \* \* \*